United States Patent [19]

Becker

[11] Patent Number: 5,680,448

[45] Date of Patent: Oct. 21, 1997

[54] CALL ROUTING SELECTION METHOD

[75] Inventor: Louis Becker, Glenview, Ill.

[73] Assignee: Advantis, Schaumburg, Ill.

[21] Appl. No.: 956,366

[22] Filed: Oct. 5, 1992

[51] Int. Cl.$^6$ ............................................. H04M 7/00
[52] U.S. Cl. .................. 379/221; 379/220; 379/265
[58] Field of Search ............................ 379/220, 221, 379/265, 266, 113, 309

[56] References Cited

U.S. PATENT DOCUMENTS

| | | |
|---|---|---|
| 3,111,561 | 11/1963 | Dunning . |
| 3,542,961 | 11/1970 | Klein et al. . |
| 4,048,452 | 9/1977 | Oehring et al. . |
| 4,191,860 | 3/1980 | Weber . |
| 4,400,587 | 8/1983 | Taylor et al. . |
| 4,510,351 | 4/1985 | Costello et al. . |
| 4,611,094 | 9/1986 | Asmuth et al. . |
| 4,669,113 | 5/1987 | Ash et al. . |
| 4,670,899 | 6/1987 | Brody et al. . |
| 4,737,983 | 4/1988 | Frauenthal et al. . |
| 4,748,658 | 5/1988 | Gopal et al. ............................. 379/221 |
| 4,757,267 | 7/1988 | Riskin . |
| 4,788,721 | 11/1988 | Krishnan et al. ................... 379/113 X |
| 4,908,850 | 3/1990 | Masson et al. . |
| 4,953,204 | 8/1990 | Cuschleg, Jr. et al. . |
| 4,974,256 | 11/1990 | Cyr et al. . |
| 4,979,118 | 12/1990 | Kheradpin ......................... 379/220 X |
| 5,153,909 | 10/1992 | Beckle et al. ....................... 379/266 X |
| 5,311,585 | 5/1994 | Armstrong et al. ................... 379/221 |

*Primary Examiner*—Krista M. Zele
*Assistant Examiner*—Daniel Hunter
*Attorney, Agent, or Firm*—Wood, Phillips, VanSanten, Clark & Mortimer

[57] ABSTRACT

A deterministic call routing system tests the allocation of an incoming call to each of X locations and selects the appropriate location. Particularly, it simulates allocation of the call to the first resource and calculates the contribution of this allocation to the deviation of a distance expression from zero. It then simulates allocation of the call to the second resource and calculates the contribution of this allocation to the deviation of the distance expression from zero. This process continues by simulating the allocation of the calls to each of the remaining X resources in turn. The algorithm then selects the location for which the deviation of the distance expression from zero will be a minimum, and actually allocates the call to that location. A call counter for that location is then incremented by one, and the allocation is then ready to allocate the next call.

13 Claims, 5 Drawing Sheets

CALL ROUTING SELECTION METHOD

FIELD OF THE INVENTION

This invention relates to the field of telephony and, more particularly, to a system where calls are routed using intelligence resident outside of the public switched telephone network.

BACKGROUND OF THE INVENTION

A telephone system, in its most basic form, comprises one individual dialing a telephone number assigned to another individual. With such a system, there is a one-to-one relationship between the dialed number and the destination. The telephone system is also designed to provide special calling services using inbound N00 telephone numbers. These numbers currently utilize the area codes 800 or 900. Particularly, businesses arrange for the use of a particular 800 number to allow customers, at no cost, to call and transact business. With a 900 number, the customer is charged for the service.

During the early 1980's, the long distance carriers removed 800 number translation and routing from switching systems and instead placed it in a call routing database, referred to as a "service control point" (SCP). This architectural implementation allowed a single nationwide N00 number to be routed to any one of a plurality of subscriber destinations. For example, a caller may wish to place an order with a company, inquire about the status of an account, or obtain information about the company's products or services. The SCP must be configured to make the determination as to which of the destinations should receive a particular call, i.e. where the call should be routed. The general type of subscriber service desired may be selected by dialing a particular number, with different numbers corresponding to different services. Alternatively, the subscriber may have a single number and utilize prompting whereby additional digits are entered by the caller to specify the particular service desired. All of this information is used by the SCP to make the routing decision.

In response to a call routing inquiry from a carrier switch node, the SCP makes the routing decision based on some combination of specified criteria, namely, originating area code and/or exchange, time of day, day of week, date, and any caller entered digits. These call characteristics are compared to call screening criteria resident in the SCP in the form of a "routing tree" to determine the destination to which the call should be routed. The call routing response results in the call either being routed to a specific location or allocated among a set of locations using preselected percentages. The subscriber may change the call screening procedure and call allocation percentages by inputting these changes to the SCP in the form of a new or revised routing tree. These changes become effective sometime after they are made depending upon the particular system used. These changes can be used to cope with unexpected variations in customer calling volume, the lack of available agents at one or more subscriber destinations and other factors. However, this is a rather slow response to a dynamically changing system.

In managing how calls are routed among several alternate subscriber destinations, caller identity, the carrier network, the SCP, and subscribers resources are all used. The subscriber strives to satisfy various performance criteria. One of extreme importance is how long it takes for a call to be answered by an agent. If the time is too long, then the perception of quality drops. If callers are held in queue, then carrier charges may increase. Finally, an abandoned call can adversely effect revenue in a sales application if a customer does not call back.

One solution is to provide a sufficient number of agents to handle the maximum number of calls expected. However, this is an economically impractical solution. An optimal solution is to utilize a minimum number of agents while routing the calls to satisfy specified performance objectives.

To route incoming calls, a desired distribution of calls among various available locations may be prescribed. The distribution is expressed in percentages, or their equivalent fractions. For example, calls may be distributed between two locations, with forty percent of the calls going to the first location and sixty percent of the calls to the second location.

Known call allocation systems use random number generators for making a routing decision. Over a sufficiently large number of calls, and assuming proper use of the random number generator, the average number of calls to each location should generally match the desired distribution. However, sizable deviations result due to the inevitable statistical anomalies which arise in the use of random number generators. The problem may be compounded since the sequence of numbers generated by a computer implementation of a random number generator is not truly random in nature. Such numbers are more properly called pseudo-random numbers.

The present invention is intended to solve one or more of the problems discussed above in a novel and simple manner.

SUMMARY OF THE INVENTION

In accordance with the invention, there is disclosed a subscriber call routing processing system which uses a deterministic call routing algorithm.

Broadly, there is disclosed herein a method of routing calls to a plurality of X different subscriber resources in a subscriber network system having a processor utilizing a routing algorithm for selecting one such resource. The method comprises the steps of selecting a desired distribution of calls among the X resources, for each call to be routed calculating X simulated distributions, each such simulated distribution being calculated assuming that the call is to be selected to be routed to a different one of the X resources, comparing each X simulated distributions to the desired distribution to determine a best distribution and selecting a resource associated with the best distribution for routing the call.

It is a feature of the invention that the first selecting step comprises selecting an allocation percentage for each of the X resources.

It is another feature of the invention that the comparing step comprises the step of determining a deviation of each of the X simulated distributions from the desired distribution.

It is a further feature of the invention that the comparing step further comprises the step of selecting the simulated distribution having the lowest deviation.

It is yet another feature of the invention to provide the step of storing a number of calls previously routed to each of the X resources for calculating each of the X simulated distributions.

There is disclosed in accordance with another aspect of the invention a method of routing calls comprising the steps of selecting a desired percentage distribution of calls among the X resources, storing information representing an actual number of calls previously routed to each of the X resources, receiving a request for routing a call, and for each request received, calculating X simulated percentage distributions, each such simulated percentage distribution being calculated using the stored information and assuming that the call is to be selected to be routed to a different one of the X resources, comparing each of the X simulated percentage distributions to the desired percentage distribution to determine a best distribution, selecting the resource associated with the best distribution for routing the call, and transmitting a response identifying the selected resource.

The disclosed algorithm tests the allocation of an incoming call to each of the X locations and selects the appropriate location. Particularly, it simulates allocation of the call to the first resource and calculates the contribution of this allocation to the deviation of a distance expression from zero. It then simulates allocation of the call to the second resource and calculates the contribution of this allocation to the deviation of the distance expression from zero. This process continues by simulating the allocation of the call to each of the remaining resources in turn. The algorithm then selects the location for which the deviation of the distance expression from zero will be a minimum, and actually allocates the call to that location. A call counter for that location is then incremented by one, and the algorithm is then ready to allocate the next call.

Further features and advantages of the invention will readily be apparent from the specification and from the drawing.

DETAILED DESCRIPTION OF THE DRAWING

Figure 1:
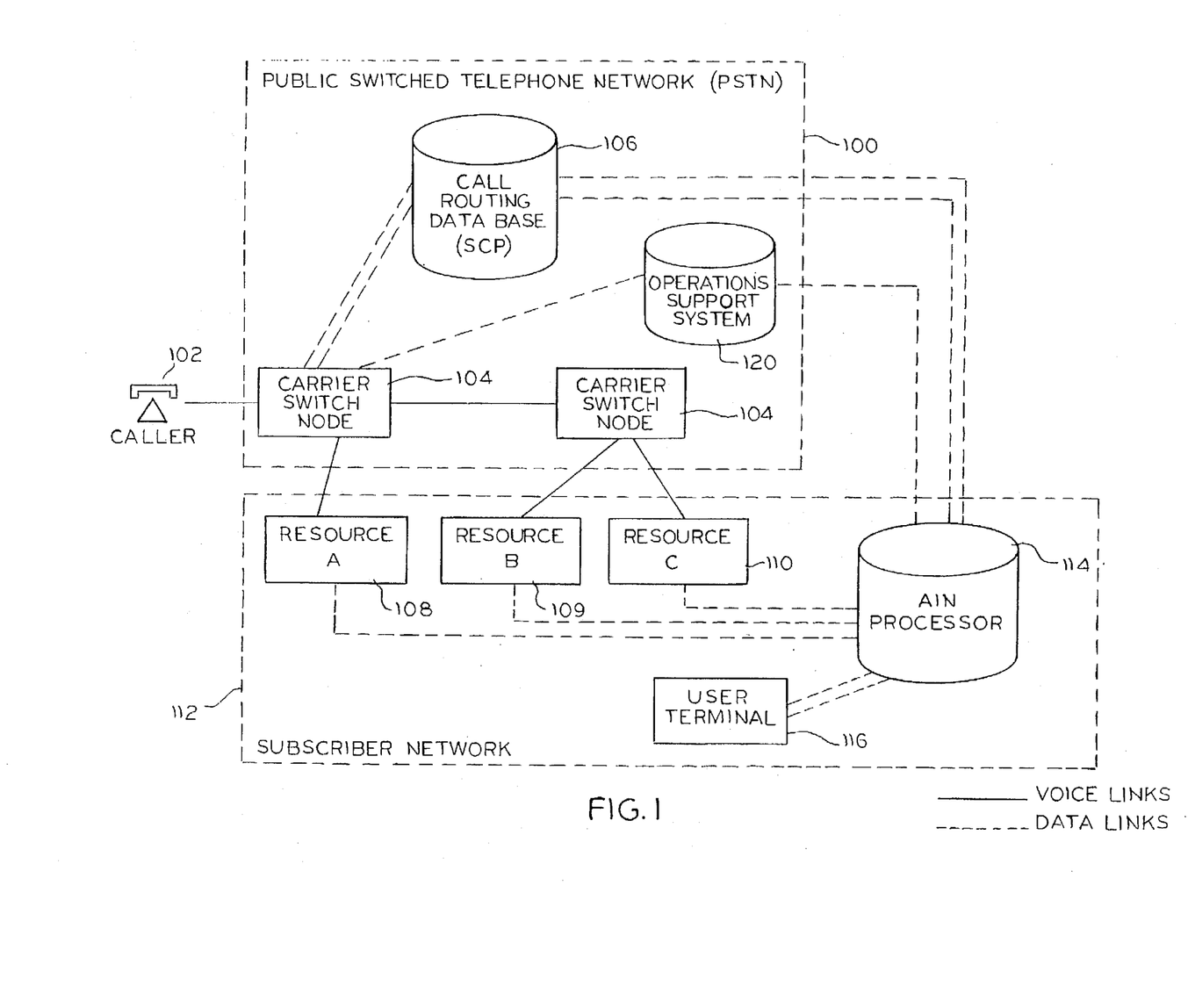
FIG. 1 is a diagrammatic/block diagram illustrating basic elements in the public switched telephone network and a subscriber network in accordance with the invention.

With reference to FIG. 1, a diagrammatic/block diagram illustrates a subscriber call routing processing system used in accordance with the invention. The system is designed to allow a subscriber the ability to control routing of inbound N00 (currently area codes 800 or 900) telephone calls to a desired destination or resource based on the subscriber supplied routing criteria. This embodiment of the invention uses area codes 800 and 900 but can easily be extended to support any inbound service and any numbering plan.

The system utilizes the facilities of the public switched telephone network (PSTN) 100 provided by one or more network carriers. These carriers include, for example, Sprint, MCI, AT&T and any local exchange carrier. A caller originates a call at a telephone 102 by dialing a number assigned to the particular subscriber. The call is connected to one of many carrier switch nodes 104 contained in the PSTN 100. The particular carrier switch node 104 is generally that in closest proximity to the caller 102. The carrier switch node 104 temporarily suspends the call setup process owing to the receipt of an N00 number and launches a routing query to the carrier's call routing database or service control point (SCP) 106. Based on the number dialed, a call translation process is invoked in the SCP 106 using routing trees configured for the subscriber. Within a subscriber network 112, there are included a plurality of resources, identified as Resources A, B and C, 108, 109 and 110, respectively, to which the calls should ultimately be routed. Conventionally the routing decision is made by the routing tree at the SCP 106. The SCP 106 controls switching in the carrier switch nodes 104 to connect the caller 102 to one of the resources 108–110. One example of such a conventional system is disclosed in Frauenthal et al., U.S. Pat. No. 4,737,983.

In accordance with the invention, the subscriber network 112 also includes an advanced intelligent network (AIN) processor 114, and a user terminal 116 for making routing decisions outside of the PSTN 100. The SCP 106 is modified so that instead of directly implementing decisions from its own routing tree, it launches a routing query to the AIN processor 114 in the subscriber network 112. Based on the information provided by the carrier within the routing query, information provided by the carrier's operation support system 120 about the status of the facilities, and information about the status of the resources 108–110 which may handle the call, the AIN processor 114 returns a resource identifier to the SCP 106. This response may also include data to be delivered to the resource by the PSTN 100. The SCP 106 receives the routing response from the AIN processor 114 and instructs the carrier switch node 104 to resume the call setup process and complete the call through the PSTN 100 to the designated subscriber resource 108, 109 or 110.

Routing queries from different callers for the same dialed number may simultaneously originate in more than one carrier network, based on the needs of the subscriber and the capabilities of each carrier. The subscriber interfaces with the AIN processor 114 through the user terminal 116.

The AIN processor 114 may comprise a single processing system or separate processing systems connected via a suitable network. Advantageously, the functions are implemented in a customer information control system (CICS). A CICS is a program operating a processing system enabling transactions entered at remote terminals to be processed concurrently by subscriber application programs. The various functions consist of either regions within the system, or tasks performing part of a particular region.

The AIN processor is more particularly disclosed in Reynolds et al., pending application Ser. No. 848,247, filed Mar. 9, 1992, and owned by the assignee hereof, the specification of which is hereby incorporated by reference herein.

The SCP 106 is part of the public switched telephone network 100 and is not itself part of the invention. Nevertheless, the subscriber network 112 must communicate with the SCP 106 to permit routing decisions to be made externally of the PSTN 100. A new node type similar to existing allocation, time and NPA nodes is defined for the N00 system in the SCP 106. This node allows the subscriber to interact with the SCP via a communication interface to make real time routing decisions based on subscriber defined algorithms described in the subscriber network 112. If a valid response is not obtained on the communication interface, then a default decision is made by the routing tree in the SCP 106.

Within the SCP 106 the new node type is processed exactly as the existing time, NPA and allocation nodes until it is accessed for call processing. When accessed for call processing in the SCP 106 the line identification field in the node is compared with an SCP configuration database for the selection of the session and physical communication line to be used. If that session is in accessible status for an open with no unresolved errors, then the SCP 106 transmits an inquiry message on that session. If a response to the inquiry is received within a short timeout (nominally 500 milliseconds) which matches a selection on the node, then processing continues with that selection. Otherwise, processing continues with the default selection defined within the SCP 106.

In order to assure rapid response, high speed point-to-point lines are used. Inquiries are transmitted as calls are processed without waiting for a response to previous inquiries. Volumes of up to forty inquiries per second are supported in a single session. Thus, up to twenty inquiries may be outstanding at any one time. Application timeout is measured from transmission of the inquiry to receipt of response to that inquiry. Both sides of the interface perform automatic error recovery when possible consistent with minimizing response time and code complexity. In order to minimize the impact on call processing performance, the SCP 106 maintains its status indication on each session and only attempts to send inquiries on a session with verified status.

The SCP 106 generates an inquiry message when a communication node is encountered in processing a call. Each inquiry message will contain:

1. Inquiry ID;
2. NPA-NXX-XXXX (or as many digits as available);
3. N00 Number;
4. Node Identifier;
5. Caller information (such as class of service); and
6. Caller entered digits.

The subscriber network 112 generates a response message in response to an inquiry. The inquiry ID will be from the inquiry message received. Each response will contain:

1. Inquiry ID;
2. Select Code;
3. Destination tag; and
4. Caller information.

When the session is established, initialization messages are exchanged identifying the communication node processed by node identifier.

"NPA-NXX-XXXX" designates the area code, exchange and station of the caller. "N00 number" identifies the number dialed by the caller. "Node identifier" specifies a character string identifying a particular usage of the communication feature known to both the SCP 106 and the AIN processor 114. The "Select code" and "Destination tag" identify a particular routing choice. These are also known to both the SCP 106 and the AIN processor 114.

Figure 2:
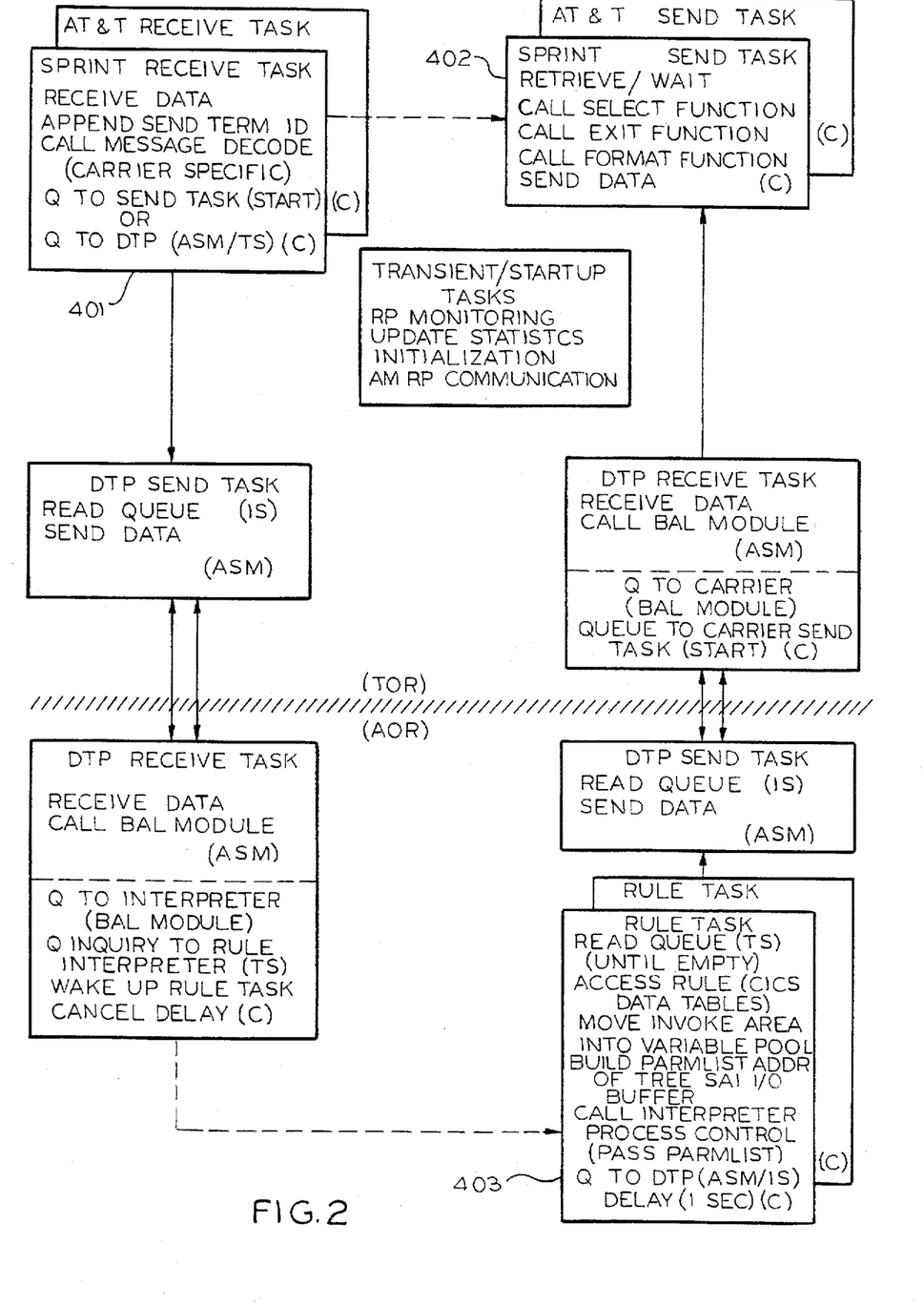
FIG. 2 is a flow diagram illustrating operation of a routing process for the AIN processor of FIG. 1.

With reference to FIG. 2, a flow diagram illustrates interrelationship of the tasks implemented in the routing processor CICS region.

Communications with a carrier, such as Sprint or AT&T, use send/receive pipes using a generic receive task 401 which calls a carrier-specific message inbound decoding routine. The receive task 401 reads an input from a receive pipeline, determines the appropriate send task on which to return the response, prefix the message with the CICS terminal ID and recall the message decode routine. After decoding is performed, the message is either queued back to the send task 402, queued to the AOR for further processing, or logged, based on the action indicator setting. The inbound message decode routine takes the input format used by the carrier and performs any reformatting to internal AIN formats or response formats as necessary. The message decoder returns an action indicator to inform the main line as to the disposition of the message. Three other processing routines include queue to DTP, queue to send, and error logging. The queue to DTP routine passes a pointer to the message to be queued, and the name of the target remote CICS region.

The queue to DTP routine passes a pointer to the message to be queued, and the name of the target remote CICS region. This routine builds a parm list containing the address of the data to be queued, the length of the data, the type of queuing to be performed (in this case, queue to connection group). This parm list is passed to a routine which does the actual queuing. A return code is set in the parm list to indicate the result of the queuing attempt. At the bottom of the infinite loop a delay for one minute is issued before returning to the top to begin reading the queue again. If inquiries are added to the queue during this delay time, the task queues the inquiries to the interpreter, issues a cancel for the delay, thus waking up the sleeping rule interpreter.

Communications with a carrier using send/receive pipes are done using a generic send task 402 which calls carrier specific outbound message processing and formatting routines. The send task 402 first reads data from its queue using a retrieve/wait facility. The carrier specific message outbound processing is called at this point to determine further processing for the message. After the processing is complete, it is possible to call an exit function to perform additional processing if necessary. The outbound message formatting routine places the message into the format expected by the carrier to which it will be sent. Lastly, the message is sent to the carrier via a SEND command.

Multiple rule tasks 403 may be started and run in parallel, primarily for failure recovery purposes. The main processing routine consists of an infinite loop in which it attempts to read and process an inquiry queue until it is empty, and then wait for one minute before returning to the top of the loop. The main routine accesses a pointer to the next item to be processed.

The inquiry queue is initially a temporary storage queue. The pointer is enqueued upon, the inquiry read from the queue, the pointer updated to reflect the next item to be read, then a de-queue is issued to release the pointer. Another task is then queued on the pointer, then the rule task waits for it to become available.

The inquiry record contains an 800 number which is checked against the active rule table to determine which routing rule is selected for processing. Each N00 number is associated with a particular rule. Once the routing rule name has been determined, then the rule, residing on a subscriber maintained data table, is retrieved. Pointers to the rule, the inquiry record, the AIN anchor table, and the IO buffer are passed to the interpreter function. The interpreter function executes the routing rule and builds the outcome record in the IO buffer. The main processing then calls the queue to DTP routine to send the outcome record back to the TOR.

As described in the Reynolds et al. application incorporated by reference herein, call routing instructions specify a sequence in which call characteristics and caller attributes are compared to various call screening criteria. Based on one or more successful matches between values of the call being routed and values in the call screening criteria, one of three routing functions may be performed. The three types of routing functions are route, allocate and select. The route function directs the call to a single specified destination. The allocate function routes the call based on the contents of an allocation table comprising a list of destinations with specific percentages assigned. The select function uses load balancing based on the contents of a routing outcome, precedence level, and performance criteria.

When routing a call based on allocation percentages, it is desirable that the number of calls which must be routed before a desired distribution is reached is a small number. In accordance with the invention, a routing allocation algorithm is used to satisfy this desire.

The algorithm depends on the concept of the distance between two distributions, which we define as follows.

The value X represents the number of resources or locations. A desired distribution is described by the set of decimal fractions $$\{a_1, a_2, \ldots, a_x\}$$

and the actual distribution is described by another set of decimal fractions $$\{b_1, b_2, \ldots, b_x\}.$$

The distance D between the two distributions is defined as $$D=(b_1-a_1)^2+(b_2-a_2)^2+\ldots+(b_x-a_x)^2.$$

If the $a_i$ fractions represent the desired distribution and the $b_i$ fractions represent the actual distribution, then the goal is to place each call so that the distance D defined by the above expression is as close to zero as possible.

The algorithm tests the allocation of the incoming call to each of the X resources and selects the appropriate resource. It simulates allocation of the call to resource 1 (for example), and calculates the contribution of this allocation to the deviation of the distance expression D from zero. It then simulates allocation of the call to resource 2 and calculates the contribution of this allocation to the deviation of the distance expression D from zero. It continues this process by simulating the allocation of the call to each of the remaining resources in turn. It then picks the resource for which the deviation of the distance expression D from zero will be a minimum, and actually allocates the call to that resource. The call counter for that resource is increased by one. The algorithm is then ready to allocate the next call.

Figure 3:
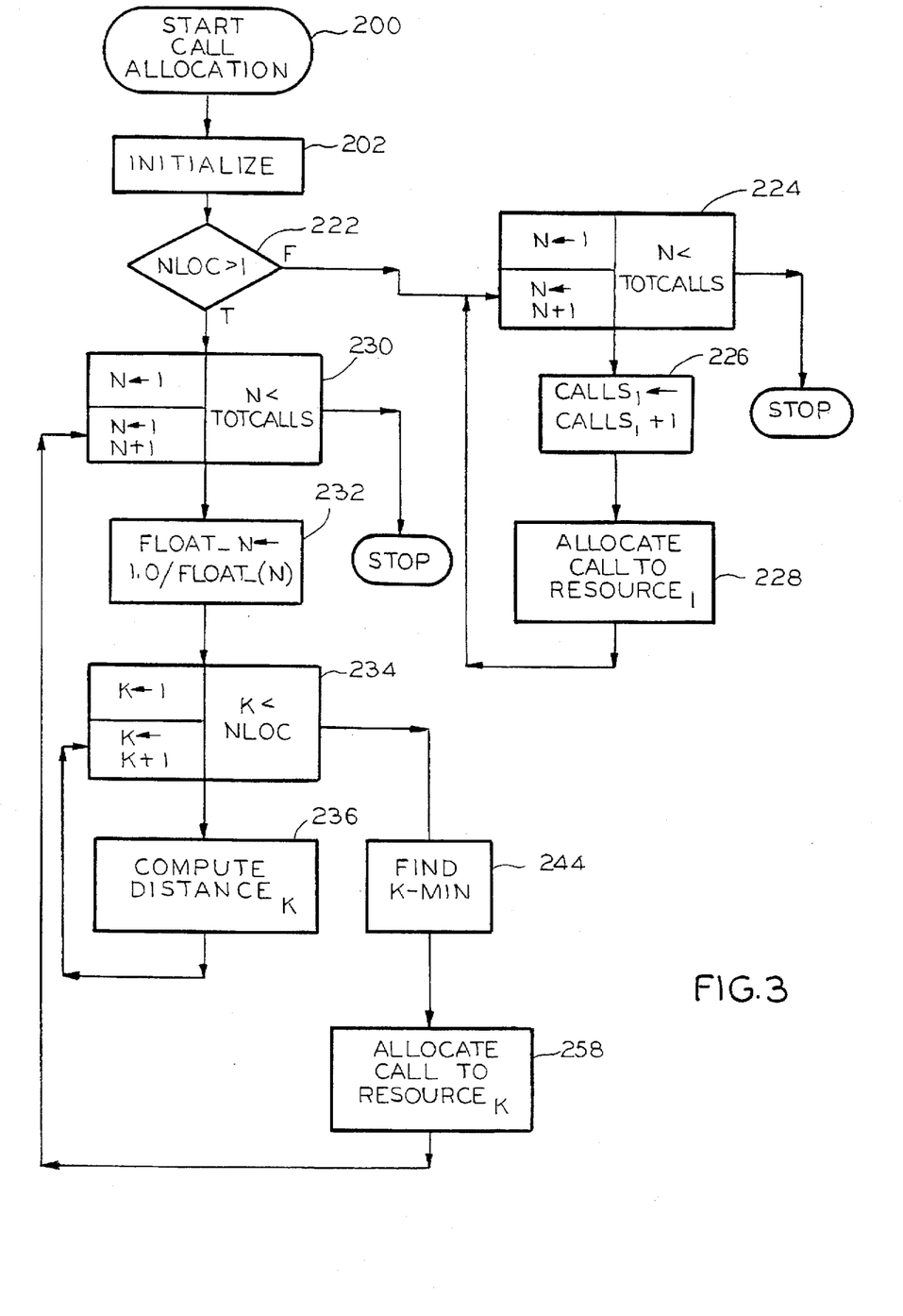
FIG. 3 is a flow diagram illustrating operation of a routing rule task of the flow diagram of FIG. 2.
Figure 4:
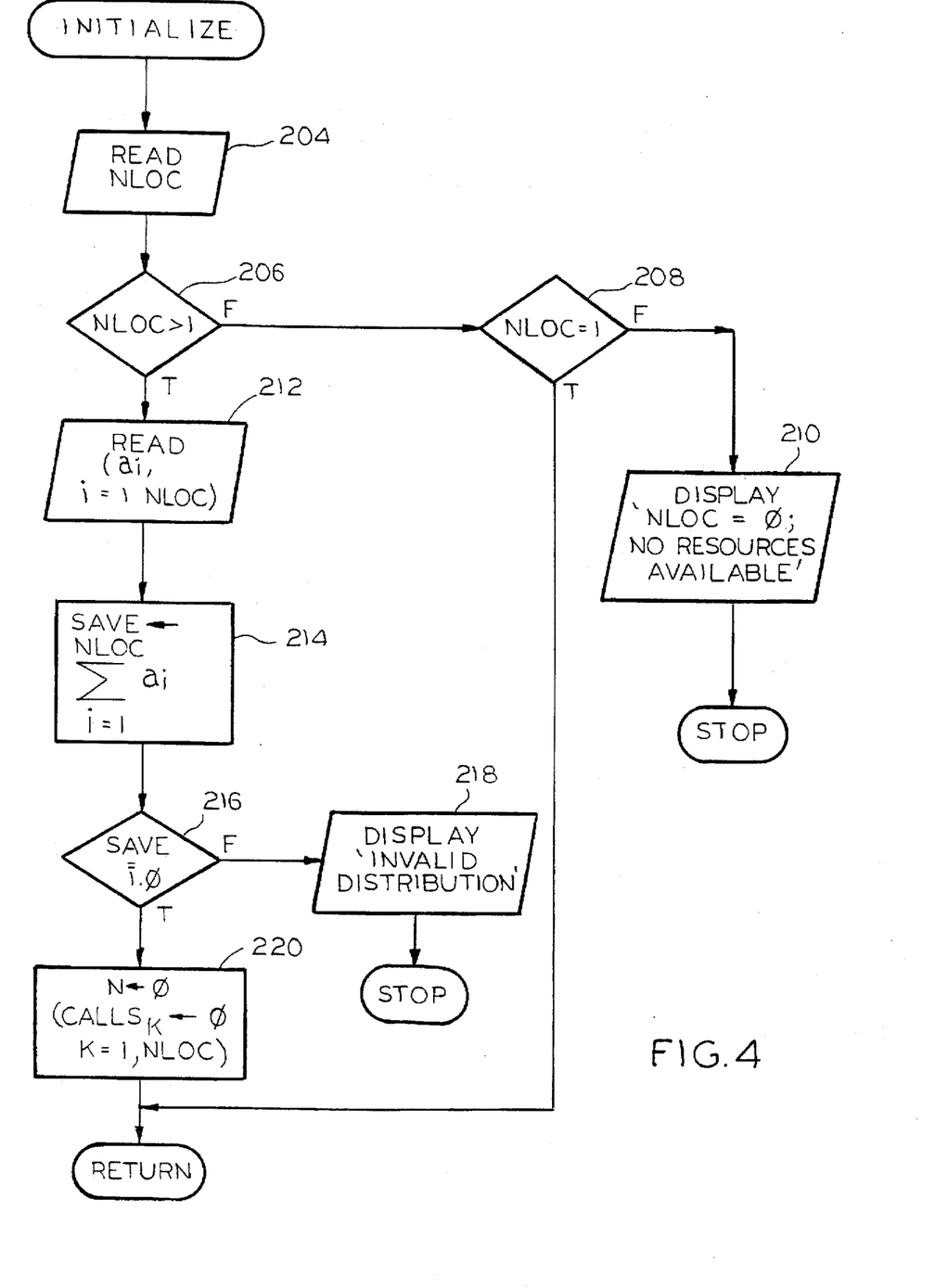
FIG. 4 is a flow diagram illustrating operation of an initialize sub-routine for the routing rule task of FIG. 3.

With reference to FIG. 3, a flow diagram illustrates implementation for the program for the routing rule or call allocation task. The task begins at a block 200, after which an initialize sub-routine is implemented at a block 202. The initialize sub-routine is illustrated in FIG. 4 and begins at a block 204 which reads a value NLOC, representing the number X of resource locations. A decision block 206 determines if the value NLOC is greater than one. If not, meaning there is only one resource, then there is no need to implement the remainder of the algorithm. A decision block 208 determines if the value NLOC is equal to one. If not, then the value is zero or a negative number and an error message is displayed at a block 210 and the program terminates. If the value NLOC is equal to one then the sub-routine ends.

Returning to the decision block 206, if the value NLOC is greater than one, then control advances to a block 212. At the block 212 the program reads from memory the values $a_i$ for i=1 through NLOC. These values represent the desired distribution of calls between the NLOC locations. At a block 214 a value SAVE is set equal to the sum of the $a_i$ values. The sum of the $a_i$ values should equal one. A decision block 216 determines if the SAVE value is equal to one. If not, then an error message is displayed at a block 218 and the program terminates. If the SAVE value is equal to one, then the program advances to a block 220, which sets a variable N equal to zero and each variable $calls_k$ equal to zero for k=1 through NLOC. This step is done to initialize the number of calls routed to each resource to the value zero. (Each variable $calls_k$ is used to store a value identifying the number of calls which have been routed to its particular location.) The initialize sub-routine then ends and returns to the allocation task of FIG. 3.

The allocation task continues at a decision block 222 which determines if the value NLOC is greater than one. If not, then a block 224 executes a FOR statement which initially sets the variable N equal to one and then increments it on each pass through the loop as long as N is less than or equal to a variable TOTCALLS. The variable TOTCALLS represents the maximum number of calls to be routed prior to restarting the algorithm, as discussed below. Once the variable N exceeds TOTCALLS the program terminates. From the block 224, a block 226 increments the call counter variable $calls_1$ by one. The call is then allocated to resource one at a block 228. The routine then loops back to the block 224 for routing the next call.

Returning to the decision block 222, if the value NLOC is greater than one, then another FOR statement is executed at a block 230 which initially sets the variable N equal to one and then increments it on each pass through the loop as long as N is less than or equal to the variable TOTCALLS. Once the variable N exceeds TOTCALLS the program terminates. From the FOR statement a value float_N is set equal to 1.0/float_(N) at a block 232. This is done in a C program to convert an integer number to a decimal number. Thereafter, a further FOR statement is executed at a block 234, which initially sets a variable k equal to one and then increments it each pass through as long as k is less than or equal to NLOC. This loop calculates a distance between the desired distribution and simulated distribution for each of the NLOC resource locations. Initially, k is set equal to one and then the program advances to a block 236 to run a compute distance$_k$ routine illustrated in FIG. 5.

Figure 5:
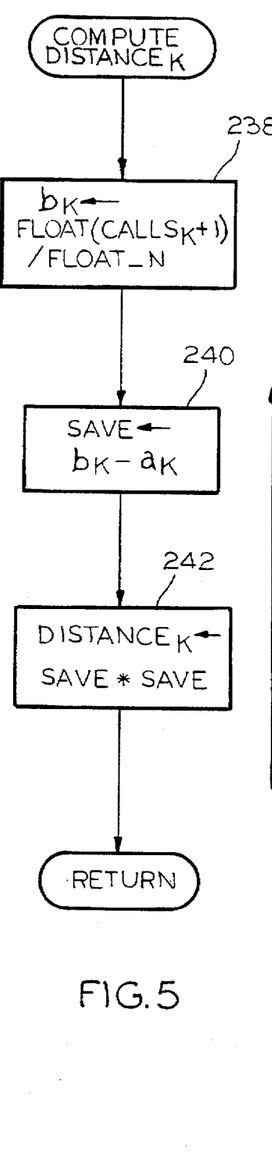
FIG. 5 is a flow diagram illustrating operation of a compute distance sub-routine for the routing rule task of FIG. 3.

The distance$_k$ routine begins at a block 238, which implements the following equation:

$$b_k=float(calls_k+1)/float\_N$$

On the first pass through the loop, k is equal to one. The variable $calls_1$ identifies the number of calls previously routed to resource location 1. The program assumes that the next call is to be routed to this location, increments the call counter by one, and divides the result by the number N of calls which have been routed to determine $b_1$, i.e. the actual distribution to resource 1 if the call is routed there. At a block 240 the value SAVE is set equal to $b_k-a_k$. A value distance$_k$ is calculated by squaring the value SAVE at a block 242. The value distance$_k$ represents how much the distance between the actual and desired distributions will change if the call is allocated to resource k. The sub-routine ends by returning to the block 234 of FIG. 3.

At the block 234, the value k is incremented by one, and assuming that it remains less than or equal to NLOC, then control loops back to perform the compute distance$_k$ sub-routine for the next resource location. This is repeated until a value distance$_k$ is calculated for each of the NLOC resources.

Figure 6:
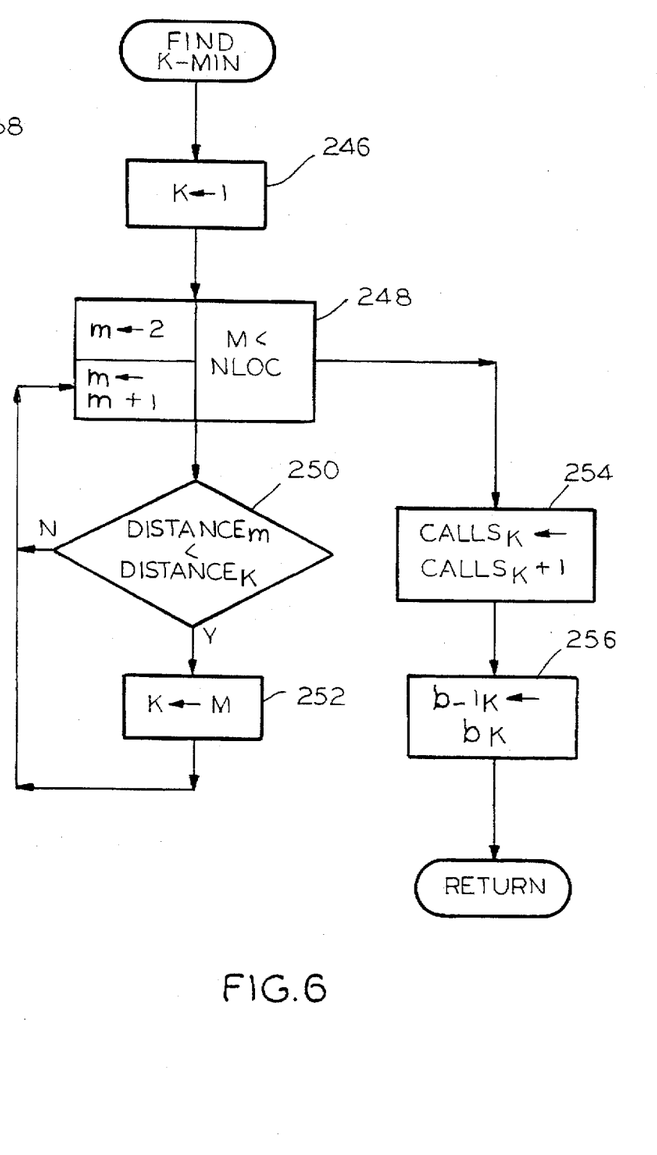
FIG. 6 is a flow diagram illustrating operation of a k_min routine for the routing rule task of FIG. 3.

At such time as all of the distance$_k$ values have been calculated, then control advances from the block 234 to a block 244 to implement a find k-min routine illustrated in FIG. 6. This routine is used to select the resource to which the call should be routed so that the distance between distributions is as close to zero as possible. In making the selection the program does not calculate the entire distance expression D, shown above. Instead, the program recognizes that the individual terms $(b_k-a_k)^2$ will not change significantly except for the term related to the selected resource. Therefore, the routine selects the term $(b_k-a_k)^2$ that would provide the least contribution to the sum.

The find k_min routine begins at a block 246 which sets k equal to one. A FOR statement is executed at a block 248 which initially sets the variable m equal to two and then increments it on each pass through the loop as long as m is less than or equal to the variable NLOC. The loop begins at a decision block 250 which determines if the value distance$_m$ is less than the value distance$_k$. If not, then control returns to the block 248. If so, then at a block 252 the variable k is set equal to m. In this loop the variable k represents the resource location resulting in the least change in the distance D between distributions. At the block 248, the value m is incremented by one and control returns to the decision block 250. This loop continues as long as the value m is less than or equal to NLOC, at which time control advances to a block 254. At this time the variable k identifies the selected resource. The block 254 increments the call counter calls$_k$ for the selected resource by one. The actual distribution percentage b_l$_k$ for selected location k is then set equal to b$_k$ at a block 256 and the routine ends. Thereafter, returning again to FIG. 3, the allocation task allocates the call to resource k at a block 258 and the program is then ready to allocate the next call as by thereafter starting at the block 230 once the next call is received. As discussed above, a message is then transmitted to the SCP 106, see FIG. 1, identifying the selected resource.

Owing to use of the described routing allocation task, the number of calls which must be routed before the desired distribution is reached is relatively small.

Periodically, the allocation to a particular set of locations may be modified. When doing so, the allocations should be restarted as by resetting the call counters to zero. This is done by reimplementing the initialize routine. Doing so results in a period of time during which the actual distribution deviates considerably from the desired distribution until such time as the system again comes to equilibrium.

The counters storing the number of calls to each location are implemented as full-precision integer variables. For example, the maximum value they can store is $2^{31}-1=2,147,483,647$ for a machine with a four-byte word (storing a long integer, in C terminology). To prevent the counters from getting too close to that limiting value, all counters for that distribution can be reset to zero to avoid fixed-point overflow using the variable TOTCALLS, discussed above. This prevents the offending counter from being read as a negative number.

Thus, there is disclosed herein a system which uses a deterministic call allocation algorithm which attempts to minimize the distance between an actual distribution and a desired distribution for call routing decisions.

I claim:

1. A method of selecting to which of a plurality of X different subscriber resources a call is to be routed to in a subscriber network system having a processor utilizing a routing algorithm for selecting one such resource, comprising the steps of:

selecting a desired distribution of calls among said X resources, the desired distribution representing a percentage of calls to be routed to each of said X resources;

upon receiving a call to be routed, then for each such call calculating X simulated distributions, one associated with each said resource, each such simulated distribution being calculated assuming that the call is to be selected to be routed to its associated said resource and not to the other resources, each said X simulated distributions representing a percentage of calls actually and assumed to have been routed to each of said X resources, whereby for each simulated distribution the percentage for its associated said resource increases and the percentage for each of the other resources decreases;

comparing each of said X simulated distributions to the desired distribution by comparing the percentages of the desired distribution to the percentages of each of the X simulated distributions for each of said X resources to determine a best distribution, the best distribution being the simulated distribution closest to the desired distribution; and selecting the resource associated with the best distribution for routing the call.

2. The method of claim 1 wherein said first selecting step comprises selecting an allocation percentage for each of said X resources.

3. The method of claim 1 wherein said comparing step comprises the step of determining a deviation of each of said X simulated distributions from the desired distribution.

4. The method of claim 3 wherein said comparing step further comprises the step of selecting the simulated distribution having the lowest deviation.

5. The method of claim 1 further comprising the step of storing a number of calls previously routed to each of said X resources for calculating each of said X simulated distributions.

6. A method of selecting to which of a plurality of X different subscriber resources a call is to be routed to in a subscriber network system having a processor utilizing a routine algorithm for selecting one such resource, comprising the steps of:

selecting a desired percentage distribution of calls among said X resources, the desired percentage distribution representing a percentage of calls to be routed to each of said X resources;

storing information representing an actual number of calls previously routed to each of said X resources;

upon receiving a call to be routed, then for each such call calculating X simulated percentage distributions, one associated with each said resource, each such simulated percentage distribution being calculated using said stored information and assuming that the call is to be selected to be routed to its associated said resource and not to the other resources, each said X simulated percentage distributions representing a percentage of calls actually and assumed to have been routed to each of said X resources, whereby for each simulated distribution the percentage for its associated said resource increases and the percentage for each of the other resources decreases;

comparing each of said X simulated percentage distributions to the desired percentage distribution by comparing the percentages of the desired percentage distribution to the percentages of each of the X simulated percentage distributions for each of said X resources to determine a best distribution, the best distribution being the simulated percentage distribution closest to the desired percentage distribution; and selecting the resource associated with the best distribution for routing the call.

7. The method of claim 6 wherein said comparing step comprises the step of determining a deviation of each of said X simulated percentage distributions from the desired percentage distribution.

8. The method of claim 7 wherein said comparing step further comprises the step of selecting the simulated percentage distribution having the lowest deviation from the desired percentage distribution.

9. The method of claim 6 further comprising the step of updating the stored number of calls previously routed to the selected resource.

10. A method of selecting to which of a plurality of X different subscriber resources a call is to be routed to in a subscriber network system having a processor utilizing a routing algorithm for selecting one such resource, comprising the steps of:

selecting a desired percentage distribution of calls among said X resources, the desired percentage distribution representing a percentage of calls to be routed to each of said X resources;

storing information representing an actual number of calls previously routed to each of said X resources;

receiving a request for routing a call;

for each request received, calculating X simulated percentage distributions, one for each said resource, each such simulated percentage distribution being calculated using said stored information and assuming that the call is to be selected to be routed to its associated said resource and not to the other resources, each said X simulated percentage distributions representing a percentage of calls actually and assumed to have been routed to each of said X resources, whereby for each simulated distribution the percentage for its associated said resource increases and the percentage for each of the other resources decreases;

comparing each of said X simulated percentage distributions to the desired percentage distribution by comparing the percentages of the desired percentage distribution to the percentages of each of the X simulated percentage distributions for each of said X resources to determine a best distribution, the best distribution being the simulated percentage distribution closest to the desired percentage distribution;

selecting the resource associated with the best distribution for routing the call; and transmitting a response identifying the selected resource.

11. The method of claim 10 wherein said comparing step comprises the step of determining a deviation of each of said X simulated percentage distributions from the desired percentage distribution.

12. The method of claim 11 wherein said comparing step further comprises the step of selecting the simulated percentage distribution having the lowest deviation from the desired percentage distribution.

13. The method of claim 10 further comprising the step of updating the stored number of calls previously routed to the selected resource.

* * * * *